US012577928B2

(12) United States Patent
Jarande et al.

(10) Patent No.: US 12,577,928 B2
(45) Date of Patent: Mar. 17, 2026

(54) PUMP ACTUATOR WITH IMPROVED FATIGUE LIFE

(71) Applicant: Eaton Intelligent Power Limited, Dublin (IE)

(72) Inventors: Swapnil Jarande, Pune (IN); Manasi Sachin Shete, Islampur (IN); Michael Halsmer, Marshall, MI (US); Matthew A. Vance, Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 21 days.

(21) Appl. No.: 18/747,235

(22) Filed: Jun. 18, 2024

(65) Prior Publication Data

US 2024/0337233 A1 Oct. 10, 2024

Related U.S. Application Data

(63) Continuation of application No. PCT/EP2022/025587, filed on Dec. 21, 2022.

(30) Foreign Application Priority Data

Dec. 21, 2021 (IN) ............................ 202111059683

(51) Int. Cl.
*F02M 59/10* (2006.01)
*F02M 59/48* (2006.01)
*F04B 53/00* (2006.01)

(52) U.S. Cl.
CPC .......... *F02M 59/102* (2013.01); *F02M 59/48* (2013.01); *F04B 53/00* (2013.01)

(58) Field of Classification Search
CPC ........ F04B 53/146; F04B 9/042; F04B 53/00; F02M 59/102; F02M 59/00; F02M 59/48;
(Continued)

(56) References Cited

U.S. PATENT DOCUMENTS 5,184,583 A * 2/1993 Grell .......................... F01L 1/16
29/888.43
5,553,512 A * 9/1996 Harimoto .................. F01L 1/14
123/90.55
(Continued)

FOREIGN PATENT DOCUMENTS

CN 102588026 A 7/2012
CN 106014735 A 10/2016
(Continued)

OTHER PUBLICATIONS

International search report and Written Opinion received for PCT Application No. PCT/EP2020/025106, 9 pages.
(Continued)

*Primary Examiner* — Mark A Laurenzi
*Assistant Examiner* — Benjamin Doyle
(74) *Attorney, Agent, or Firm* — Baker Botts L.L.P.

(57) ABSTRACT

A pump actuator for use between a cam and a pump comprises a pump actuator body having a pad defined between a plunger facing surface and an opposite roller facing surface, where the plunger facing surface is recessed into the pump actuator body and offset from a radial end. The pump actuator body further comprises a cylindrical wall defined between the radial end and the plunger facing surface. A concave surface feature is formed on the pad on its plunger facing surface. The opposite roller facing surface of the pad is provided with a surface enhancing treatment comprising shot peening. These features, separately or in combination, provide mass-neutral improvements of the pump actuator body's fatigue life.

11 Claims, 7 Drawing Sheets

(58) Field of Classification Search
CPC ................ F02M 59/44; Y10T 74/2107; Y10T 29/49304; F01L 2305/00; F01L 2305/02; F01L 1/14
USPC .............................. 417/313; 74/55, 567, 569
See application file for complete search history.

(56) References Cited

U.S. PATENT DOCUMENTS

| | | | | |
|---|---|---|---|---|
| 6,405,698 | B1 * | 6/2002 | Steinmetz | F01L 1/14 123/90.48 |
| 6,688,269 | B1 * | 2/2004 | Steinmetz | F01L 1/14 123/90.49 |
| 7,497,157 | B2 | 3/2009 | Aoki | |
| 7,793,583 | B2 | 9/2010 | Radinger | |
| 8,201,532 | B2 | 6/2012 | Prokop | |
| 8,474,427 | B2 | 7/2013 | Dorn | |
| 8,607,754 | B2 | 12/2013 | Dorn | |
| 9,422,834 | B2 | 8/2016 | Fujii | |
| 9,644,729 | B2 | 5/2017 | Berruet | |
| 9,850,785 | B2 * | 12/2017 | Berruet | F02M 59/102 |
| 10,030,548 | B2 * | 7/2018 | Viault | F02M 59/44 |
| 11,578,717 | B2 | 2/2023 | Cornett | |
| 2007/0277763 | A1 | 12/2007 | Brinks | |
| 2008/0190237 | A1 * | 8/2008 | Radinger | F01L 1/143 74/569 |
| 2011/0088506 | A1 | 4/2011 | Oishi | |
| 2011/0265752 | A1 | 11/2011 | Dorn | |
| 2012/0152187 | A1 * | 6/2012 | Cornett | F01L 1/143 29/888.43 |
| 2012/0234277 | A1 | 9/2012 | Dorn | |
| 2013/0340695 | A1 | 12/2013 | Fujii | |
| 2015/0090211 | A1 | 4/2015 | Champalou | |
| 2015/0211624 | A1 | 7/2015 | Pasaribu | |
| 2015/0330264 | A1 | 11/2015 | Hauvespre | |
| 2015/0337939 | A1 | 11/2015 | Van | |
| 2015/0369097 | A1 | 12/2015 | Hauvespre | |
| 2016/0084116 | A1 | 3/2016 | Ludwig | |
| 2016/0102395 | A1 | 4/2016 | Singh | |
| 2016/0153321 | A1 | 6/2016 | Berruet | |
| 2016/0160986 | A1 | 6/2016 | Berruet | |
| 2016/0222934 | A1 | 8/2016 | Oki | |
| 2016/0230610 | A1 | 8/2016 | Berruet | |
| 2016/0305290 | A1 | 10/2016 | Guillaume | |
| 2017/0051637 | A1 | 2/2017 | Todo | |
| 2017/0097065 | A1 | 4/2017 | Costa | |
| 2017/0218905 | A1 | 8/2017 | Oka | |
| 2017/0328322 | A1 | 11/2017 | Meier | |
| 2019/0368485 | A1 * | 12/2019 | Cornett | F04B 53/146 |
| 2020/0018296 | A1 | 1/2020 | Zhang | |
| 2021/0396197 | A1 | 12/2021 | Mohadikar | |
| 2023/0287873 | A1 * | 9/2023 | Benson | F04B 53/16 |
| 2024/0263624 | A1 * | 8/2024 | Benson | F04B 1/0417 |

FOREIGN PATENT DOCUMENTS

| | | | |
|---|---|---|---|
| CN | 206386238 | U | 8/2017 |
| CN | 110249115 | B | 9/2023 |
| DE | 102017105978 | B3 | 6/2018 |
| EP | 2719887 | A1 | 4/2014 |
| GB | 2240829 | A | 8/1991 |
| JP | 2009270693 | A | 11/2009 |
| KR | 20120106740 | A | 9/2012 |
| WO | WO 2014086698 | A1 | 6/2014 |

OTHER PUBLICATIONS

International search report and Written Opinion received for PCT Application No. PCT/US2018/014864, 12 pages.
International search report and Written Opinion received for PCT Application No. PCT/EP2022/025587, 7 pages.
US OA received for U.S. Appl. No. 16/477,944, mailed on Feb. 26, 2020, 25 pages.
US OA received for U.S. Appl. No. 16/477,944, mailed on Aug. 11, 2020, 26 pages.
US OA received for U.S. Appl. No. 16/477,944, mailed on Apr. 30, 2021, 25 pages.
US OA received for U.S. Appl. No. 16/477,944, mailed on Mar. 15, 2022, 21 pages.
US OA received for U.S. Appl. No. 18/159,191, mailed on Mar. 28, 2023, 10 pages.
US OA received for U.S. Appl. No. 17/462,653, mailed on Aug. 31, 2023, 10 pages.

* cited by examiner

PUMP ACTUATOR WITH IMPROVED FATIGUE LIFE

PRIORITY

This application is a continuation under 35 U.S.C. § 365(c) of International Patent Application No. PCT/EP2022/025587, filed on 21 Dec. 2022, which claims the benefit under 35 U.S.C. § 119 of Indian Application No. 202111059683, filed on 21 Dec. 2021, all of which are incorporated herein by reference.

TECHNICAL FIELD

The present disclosure relates generally to a pump actuator or roller tappet, and more particularly, to a pump actuator having improved fatigue life.

BACKGROUND

A pump actuator is an integral component of a spark ignition direct injection (SIDI) fuel system. The pump actuator redirects fuel pump cam rotary motion into linear fuel pump drive motion. The pump actuator is a roller follower that is sandwiched between a cam and a gasoline direct injection (GDI) pump. During operation the pump actuator pressurizes fuel inside the GDI pump so as to maintain pressure inside the fuel rail. Typical direct injection fuel pressure can be 90 times higher than conventional fuel pressures. It is desirable to increase load carrying capacity, reduce friction, and improve fatigue life of the pump actuator. Furthermore, it is desirable to reduce cost and complexity by innovative use of alternative geometry, materials, and manufacturing processes.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF PARTICULAR EMBODIMENTS

In an embodiment, a pump actuator is disclosed for use between a cam and a pump, the pump actuator a pump actuator body comprising a pad disposed between a plunger facing surface and an opposite roller facing surface, where the plunger facing surface may be recessed into the pump actuator body and offset from a radial end, the pump actuator body may further comprise a cylindrical wall disposed between the radial end and the plunger facing surface, and a surface feature may be formed on the pad on the plunger facing surface, the surface feature being concave, the concave surface feature increasing a fatigue life of the pump actuator body.

In a particular embodiment, which may combine the features of some or all above embodiments, the concave surface feature may be configured to receive a complementary surface of a plunger when the plunger makes contact with the pad.

In a particular embodiment, which may combine the features of some or all above embodiments, the plunger may be coupled to a fuel pump.

In a particular embodiment, which may combine the features of some or all above embodiments, the opposite roller facing side may make contact with a roller, the roller engaging a cam of a camshaft.

In a particular embodiment, which may combine the features of some or all above embodiments, the pump actuator body may have a unitary construction.

In a particular embodiment, which may combine the features of some or all above embodiments, the pump actuator body may be cold formed.

In a particular embodiment, which may combine the features of some or all above embodiments, the opposite roller facing surface of the pad may be provided with a surface enhancing treatment comprising shot peening, the surface enhancing treatment increasing the fatigue life of the pump actuator body.

In a particular embodiment, which may combine the features of some or all above embodiments, a pump actuator is disclosed for use between a cam and a pump, the pump actuator a pump actuator body comprising a pad disposed between a plunger facing surface and an opposite roller facing surface, where the plunger facing surface may be recessed into the pump actuator body and offset from a radial end, the pump actuator body may further comprise a cylindrical wall disposed between the radial end and the plunger facing surface, and the opposite roller facing surface of the pad may be provided with a surface enhancing treatment, the surface enhancing treatment increasing the fatigue life of the pump actuator body.

In a particular embodiment, which may combine the features of some or all above embodiments, the surface enhancing treatment may comprise shot peening.

In a particular embodiment, which may combine the features of some or all above embodiments, the pump actuator body may have a unitary construction.

In a particular embodiment, which may combine the features of some or all above embodiments, the pump actuator body may be cold formed.

In a particular embodiment, which may combine the features of some or all above embodiments, a surface feature may be formed on the pad on the plunger facing surface, the surface feature being concave, the concave surface feature further increasing the fatigue life of the pump actuator body.

In a particular embodiment, which may combine the features of some or all above embodiments, a method of making a pump actuator body is disclosed, the method comprising cold forming the pump actuator body, machining one or more features of the pump actuator body after cold forming, heat treating the pump actuator body after machining, and providing a opposite roller facing surface of a pad with a surface enhancing treatment, the pad being disposed between the plunger facing surface and an opposite roller facing surface of the pump actuator body, and the surface enhancing treatment increasing the fatigue life of the pump actuator body.

In a particular embodiment, which may combine the features of some or all above embodiments, machining the one or more features of the pump actuator may comprise machining a concave surface feature on the plunger facing surface of the pad, the concave surface feature increasing a fatigue life of the pump actuator body.

In a particular embodiment, which may combine the features of some or all above embodiments, the concave surface feature may be configured to receive a complementary surface of a plunger when the plunger makes contact with the pad.

In a particular embodiment, which may combine the features of some or all above embodiments, the pump actuator body may be cold formed from a unitary metallic piece.

In a particular embodiment, which may combine the features of some or all above embodiments, a method of making a pump actuator body may further comprise assembling the pump actuator body with a pump.

In a particular embodiment, which may combine the features of some or all above embodiments, a method of making a pump actuator body may further comprise assembling the pump actuator body with a cam.

In a particular embodiment, which may combine the features of some or all above embodiments, a method of making a pump actuator body may further comprise surface enhancing treatment comprising shot peening.

In a particular embodiment, which may combine the features of some or all above embodiments, a method of making a pump actuator body may further comprise heat treatment comprising carbon nitriding of the pump actuator body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DESCRIPTION OF EXAMPLE EMBODIMENTS

A fuel pump may be used to supply pressurized fuel to an internal combustion engine, cither to an intake manifold or to a common rail of fuel injectors of the engine. Some fuel pumps, such as Gasoline Direct Injection (GDI) pumps, may be operated using a cam shaft lobe, the cam shaft being driven by the engine. A roller tappet-based pump actuator may be employed to convert the rotary motion of the cam to a linear, reciprocating motion of a fuel pump, such as a GDI fuel pump, with friction benefits relative to a flat follower. Such a pump actuator may enable the pump to deliver a well distributed spray pattern, which allows more efficient and thorough vaporization of the fuel.

Typical Direct Injection (DI) fuel pressures may be much higher than conventional Port Injection (PI) fuel pressures. For example, in particular embodiments, DI fuel pressures may be about 350 bar, or about 90 times higher than a corresponding PI fuel pressure. Increasing pressure requirements have led to higher forces on the parts of fuel pump assemblies, creating design challenges for roller tappet-based pump actuators to sustain these high forces.

Separately or additionally, the high contact and pressure forces are dynamically imparted to the pump actuator parts based on the cyclic nature of the cam shaft's rotation, the rate of which may be a multiple of the engine crank shaft rotational speed (measured in rotations per minute, or RPM). The high forces periodically acting on the parts of the pump, such as the pump actuator, provide additional design challenges to avoid fatigue failure.

Due to the dynamic nature of the loads, contemplated design solutions may require careful consideration of the masses and mass distributions of the parts involved. Successful designs may reward mass-neutral solutions to improve fatigue life. In other words, attempts to improve fatigue life by introducing design features that increase the mass or adversely affect distributions of mass for the parts may not easily succeed. Additionally, increasingly challenging geometric and packaging design constraints exist that demand clearances for bearings and engine interfaces and significantly limit potential geometric changes and degrees of freedom for modifications. The present disclosure incorporates several innovative features to solve this problem, therein improving fatigue life of the parts of a pump actuator without increasing mass and/or adversely affect mass distribution. Some innovative features disclosed to increase fatigue life in a cost effective manner comprise, separately or in combination, one or more surface features and/or one or more surface treatments.

Figure 1:
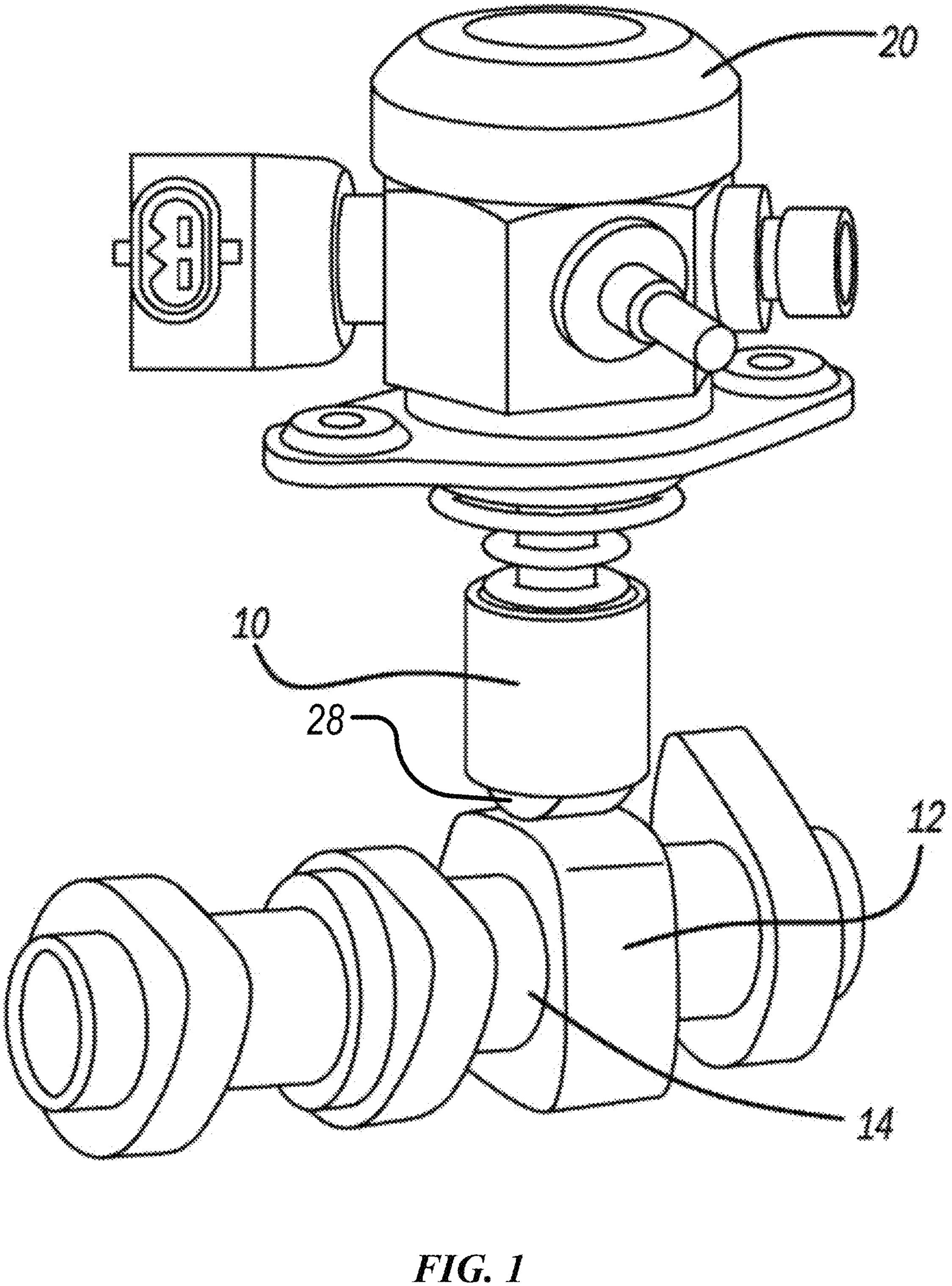
FIG. 1 illustrates a front perspective view of a pump actuator arranged between a cam on a cam shaft and a high pressure GDI pump, according to particular embodiments.

FIG. 1 illustrates a front perspective view of a roller tappet-based pump actuator 10 arranged between a cam 12 on a cam shaft 14 and a high pressure pump 20, according to particular embodiments. As a non-limiting example, the pump 20 may be a GDI pump. Translation of the pump actuator 10 may pressurize fuel inside the high pressure fuel pump 20. The pump actuator 10 may receive rotational motion of the camshaft 14 via roller 28, and may convert the rotational motion into a linear, reciprocating fuel pump drive motion.

Figure 2A:
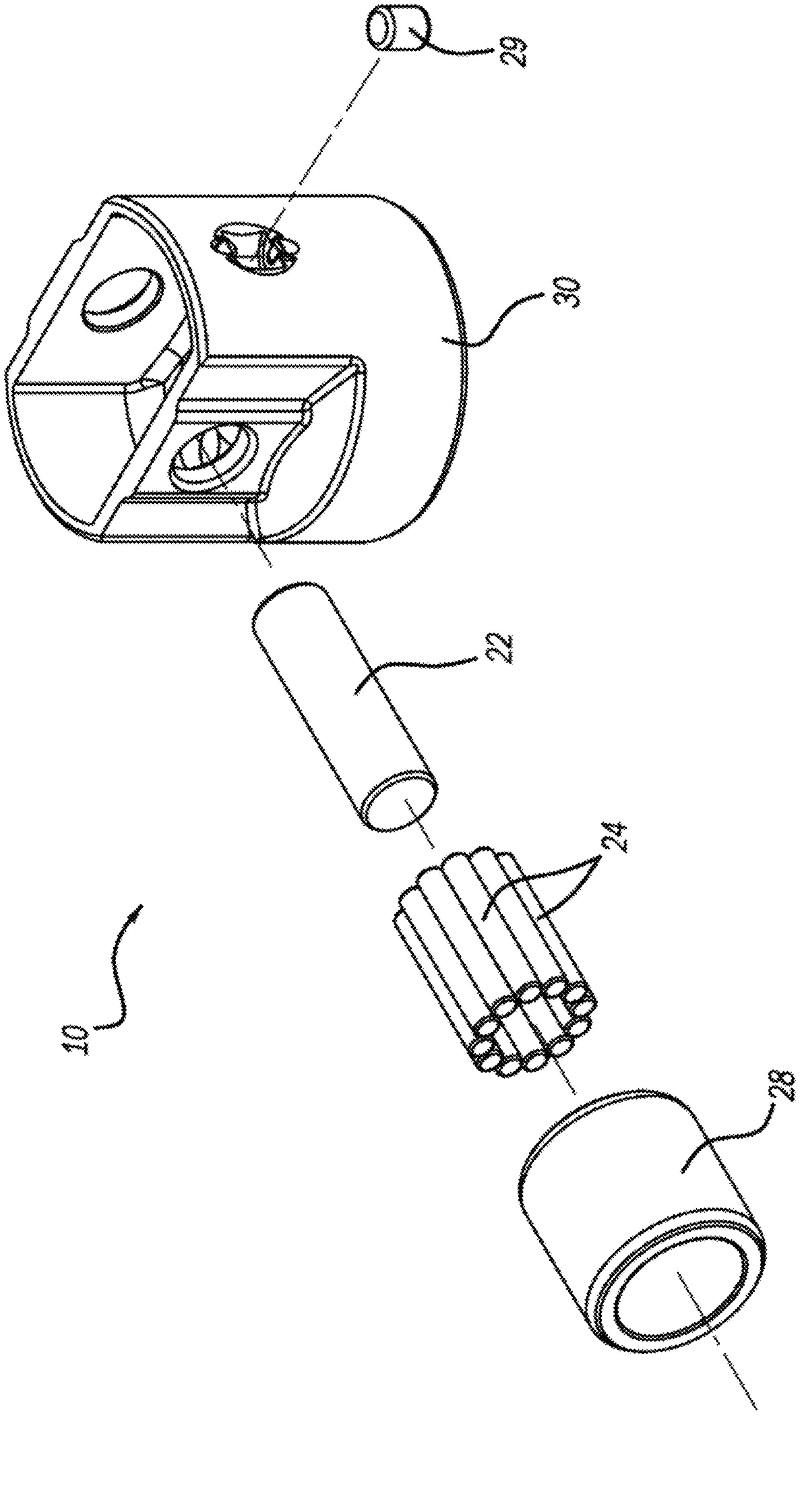
FIG. 2A illustrates an exploded view of a pump actuator, according to particular embodiments.

FIG. 2A illustrates an exploded view of a pump actuator 10, according to particular embodiments. By way of example and not limitation, a pump actuator 10 may comprise a roller assembly comprising a roller axle 22, a plurality of needles or other suitable bearing assembly 24, a roller 28, an anti-rotation pin 29, and a pump actuator body 30.

Figure 2B:
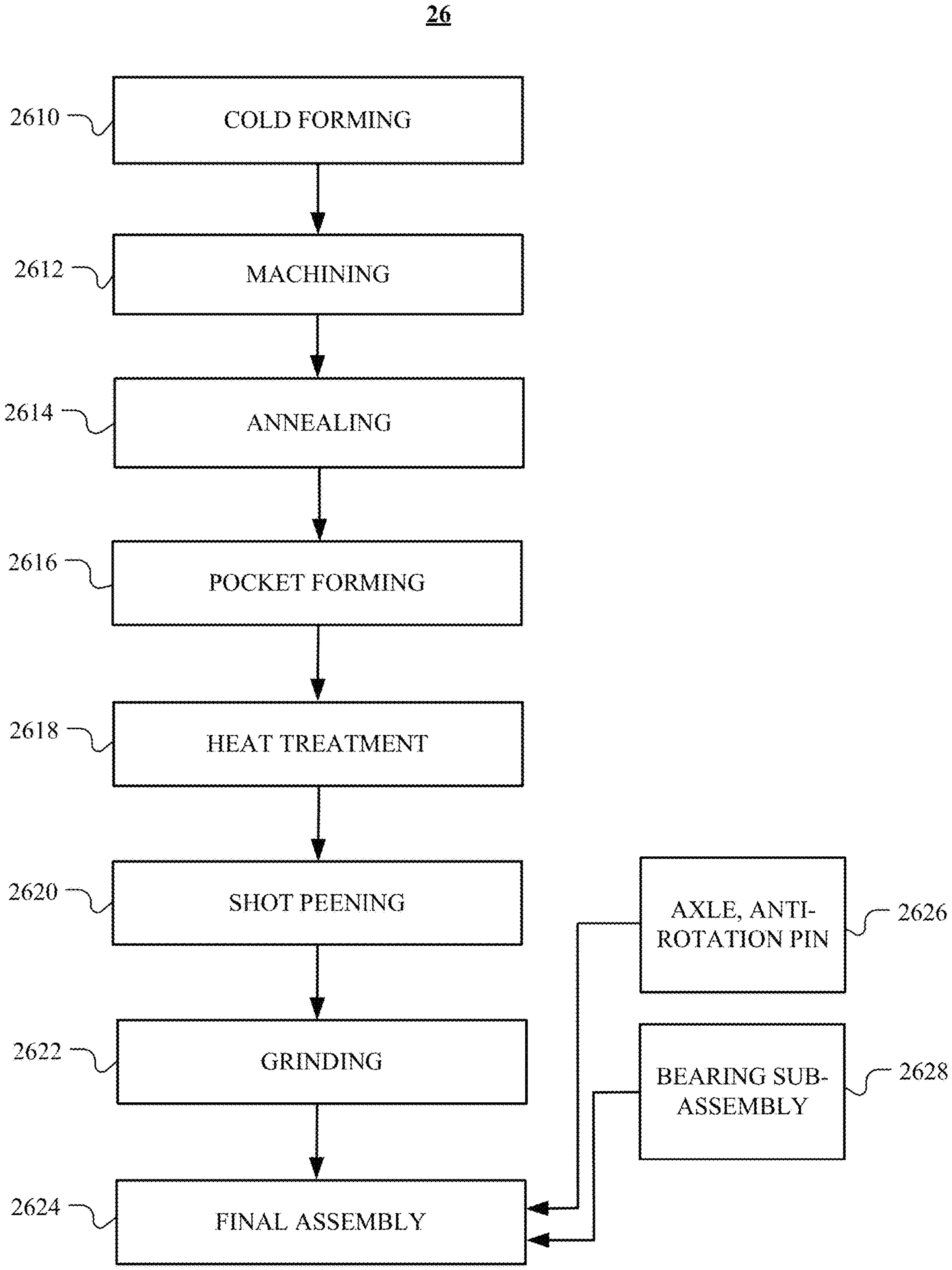
FIG. 2B illustrates an exemplary manufacturing process, according to particular embodiments.

An exemplary process for manufacturing particular embodiments of a pump actuator is shown by 26 in FIG. 2B. Although this disclosure describes particular steps and sequences of steps for manufacturing particular embodiments in a particular manner, this disclosure contemplates providing any suitable combination and/or sequence of steps for manufacturing a suitable pump actuator in any suitable manner.

As a non-limiting example, a step 2610 in a process for manufacturing a pump actuator may comprise cold forming to manufacture particular embodiments of a pump actuator body. In particular embodiments, a single piece of metal may be cold formed for manufacturing a pump actuator body having a unitary construction. In particular embodiments, a pump actuator body may be a manufactured as a one-piece body made of a forging or casting. In particular examples, a pump actuator body made from a unitary piece of metal may be stronger than examples formed from multiple pieces and/or stampings.

As a non-limiting example, a step 2612 in a process for manufacturing a pump actuator may comprise machining of a pump actuator body. In particular embodiments, a pump actuator body may be machined to provide specific features. By way of example and not limitation, a surface feature may be machined on one or more parts of a pump actuator body. By way of example and not limitation, a concave surface feature may be machined on a pad of the pump actuator body. In particular embodiments, a concave surface feature machined on a pad of the may be configured to receive a complementary surface of a plunger (or piston) of the pump, when the plunger makes contact with the pad. In particular embodiments, a machined surface feature, such as a concave surface feature, may increase a fatigue life of the pump actuator body.

As a non-limiting example, a step 2614 in a process for manufacturing a pump actuator may comprise annealing of a pump actuator body. As another non-limiting example, a step in a process for manufacturing a pump actuator may comprise pocket forming within the pump actuator body. As a non-limiting example, a step 2618 in a process for manufacturing a pump actuator may comprise heat treatment of a pump actuator body. In particular embodiments, heat treatment may comprise carbon nitriding and/or one or more other case hardening methods. As a non-limiting example, carbon may be applied during heat treatment of a pump actuator body to add a case hardening coating to the surfaces of the body.

Separately or additionally, in particular embodiments, a step in a process for manufacturing a pump actuator may comprise one or more surface treatments of a pump actuator body. By way of example and not limitation, surface treatment may further comprise shot peening 2620 of particular surfaces. In particular embodiments, a surface treatment, such as shot peening of particular surfaces, may increase a fatigue life of the pump actuator body.

As a non-limiting example, a step 2622 in a process for manufacturing a pump actuator may involve Grinding, such as Outer Diameter (OD) Grinding. As another non-limiting example, a step 2624 in a process for manufacturing a pump actuator may involve final assembly of a pump actuator body with other parts of a pump actuator. In particular embodiments, other parts for final assembly with the pump actuator body may comprise an axle, and/or one or more anti-rotation pins (2626). In particular embodiments, other parts for final assembly with the pump actuator body may comprise a bearing sub-assembly (2628), such as needles or other suitable bearings, a bearing race, and/or a plug.

Some features mentioned with reference to FIG. 2B will be described in further detail elsewhere in this document. It should be appreciated that selections and combinations of manufacture process steps described may not be limited to the described aspects, may vary across embodiments, and may be tailored based on design requirements, including but not limited to fatigue life.

Figure 3A:
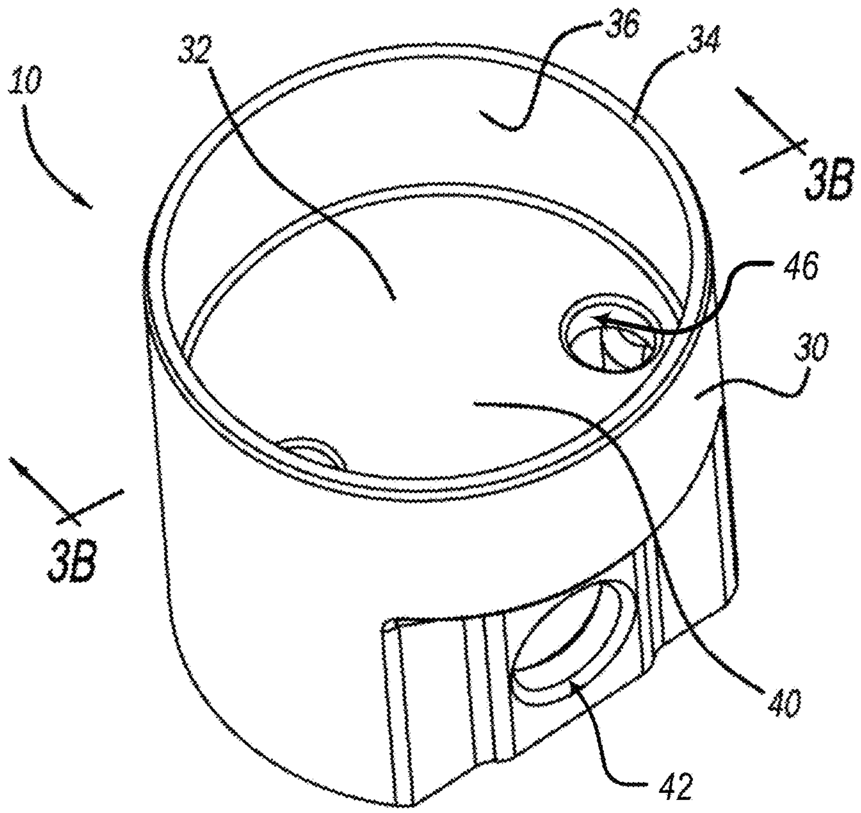
FIG. 3A illustrates a top perspective view of a pump actuator body, according to particular embodiments.
Figure 3B:
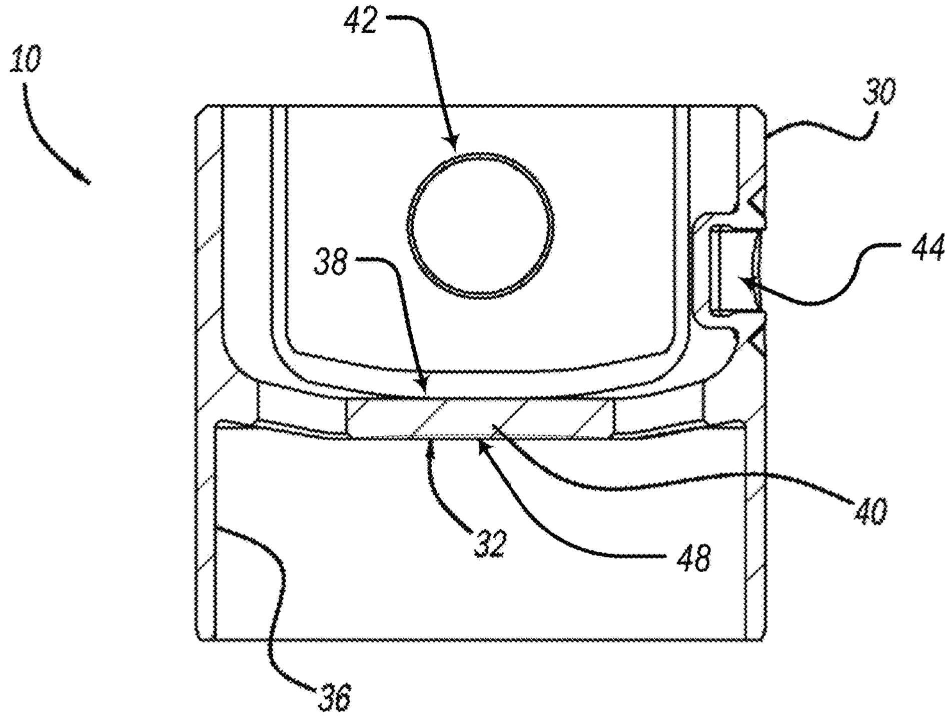
FIG. 3B illustrates a sectional view taken through the pump actuator body of FIG. 3A taken along lines 3B-3B, according to particular embodiments.

FIG. 3A illustrates a top perspective view of a pump actuator 10, according to particular embodiments. FIG. 3B illustrates a sectional view taken through the pump actuator body of FIG. 3A taken along lines 3B-3B, according to particular embodiments.

In particular embodiments, a pump actuator body 30 of the pump actuator 10 may comprise a plunger facing surface 32 that is generally recessed into the pump actuator body 30 and offset from a radial end 34. A cylindrical wall 36 may be provided between the radial end 34 and the plunger facing surface 32. A pad 40 may be disposed between the plunger facing surface 32 and an opposite roller facing surface 38. Axle cavities 42 may be configured to accommodate a roller assembly. By way of example and not limitation, a roller assembly (not shown in FIGS. 3A and 3B) for the pump actuator may comprise a roller axle, an assembly of needles or other suitable bearings, and a roller. Non-limitation illustrations of a roller assembly may be seen in FIG. 2A, as described above. In particular embodiments, a pump actuator 10 may be provided with an anti-rotation feature. By way of example and not limitation, an anti-rotation feature may comprise an anti-rotation pin crevice 44, configured to receive an anti-rotation pin. In particular embodiments, one or more vent holes 46 in the form of bores for oil and air flow may be additionally provided. As a non-limiting example, vent holes may be used for passing lubrication to the roller.

Figure 4B:
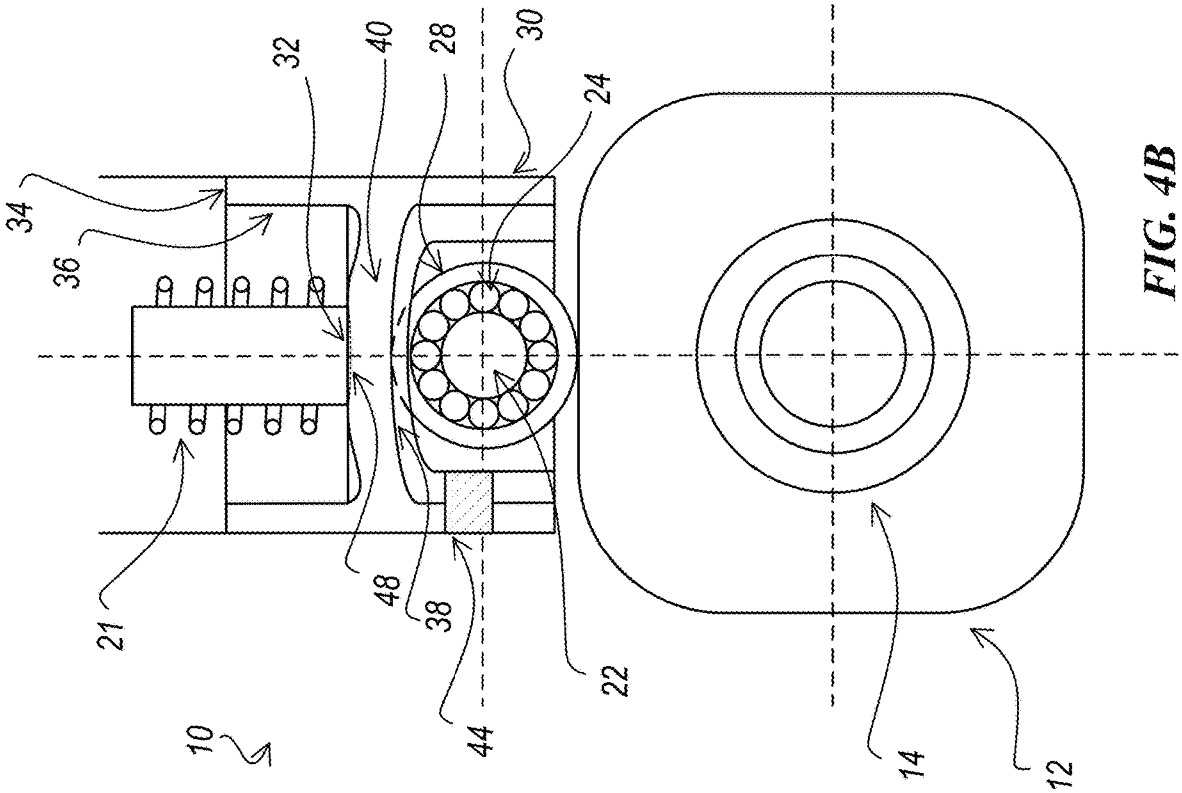
FIGS. 4A and 4B illustrate front and side sectional views of a pump actuator, according to particular embodiments.
Figure 4A:
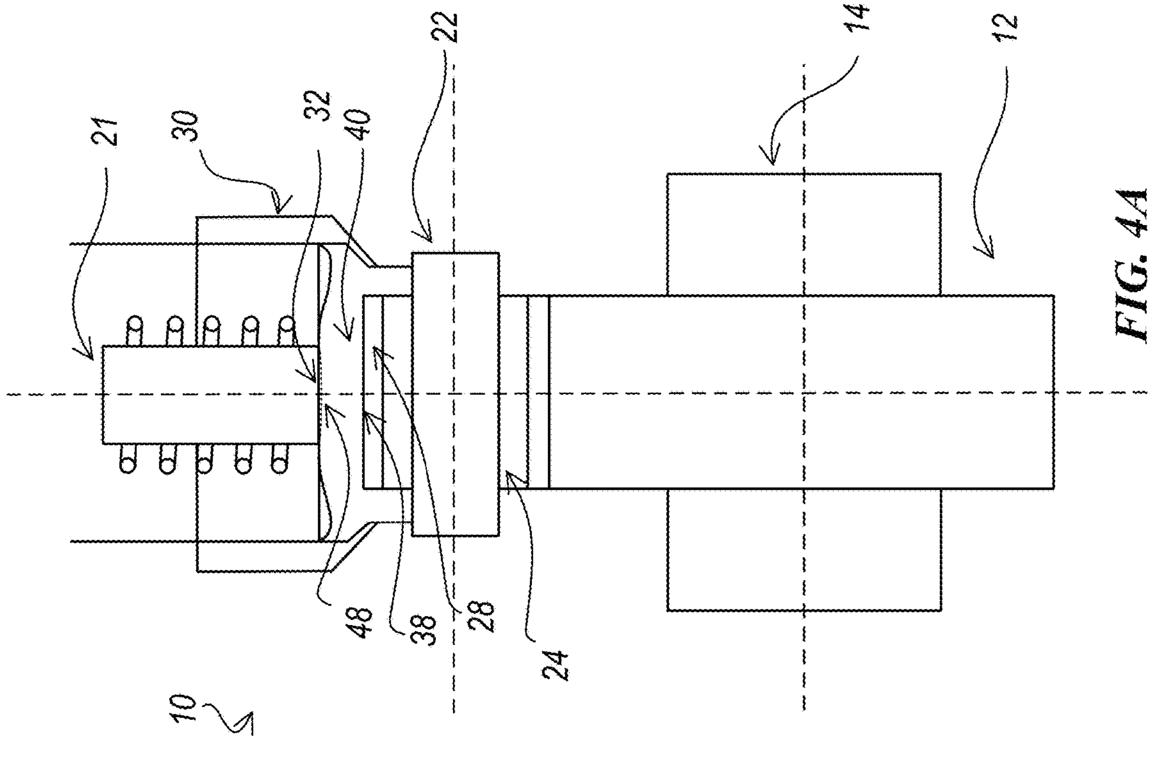

FIGS. 4A and 4B illustrate front and side sectional views of a pump actuator, according to particular embodiments.

In particular embodiments, a pump actuator 10 may comprise a pump actuator body 30, a plunger (or piston) 21, a roller 28, the roller engaging a cam 12 on a cam shaft 14. In particular embodiments, a pump actuator body 30 may comprise a plunger facing surface 32 that is generally recessed into the pump actuator body 30 and offset from a radial end 34. A cylindrical wall 36 may be provided between the radial end 34 and the plunger facing surface 32. A pad 40 may be disposed between the plunger facing surface 32 and an opposite roller facing surface 38.

In particular embodiments, axle cavities 42 may be configured to accommodate a roller assembly. By way of example and not limitation, in particular embodiments, a roller assembly may comprise a roller axle 22, an assembly of needles or other suitable bearings 24, and a roller 28.

In particular embodiments, a pump actuator 10 may be provided with an anti-rotation feature. By way of example and not limitation, an anti-rotation feature may comprise an anti-rotation pin crevice 44, configured to receive an anti-rotation pin.

As previously discussed, pump actuators may be subject to large contact and/or pressure forces, which may be periodic in nature, thereby contributing to large fatigue stresses and loading.

As a non-limiting example, the pad 40 of a pump actuator 10 may be subject to large forces at the contact interface at plunger facing surface 32, where the plunger (or piston) 21 engages the pad 40. In particular embodiments, one or more surface features, such as surface feature 48, may be formed on the pad 40 on the plunger facing surface 32, the surface features being formed to specifically increase the fatigue life of the pump actuator body. In particular embodiments, a surface feature 48 may be configured to receive a complementary surface of a plunger 21 when the plunger 21 makes contact with the pad 40. In particular embodiments, a surface feature may be configured to match the geometry of the tip of the plunger (or piston) 21, to reduce contact stresses at the pad and interfacing material. As a non-limiting example, in particular embodiments, a surface feature 48 may be concave on the pad side of the pump actuator body.

As a non-limiting example, one or more carefully designed interfacing surface features may be used to provide improved ability to counteract cyclic tensile loadings experienced by the side of the plunger facing surface 32 of the pad 40, and enable the pad 40 to better resist and endure high fatigue loads, thus providing significant improvements to material properties, stress bearing capabilities, and fatigue life of the pump actuator without adding material or mass to the pump actuator body. In particular embodiments, cold forming may be used to reconfigure material around the concave portion.

As another non-limiting example, the pad 40 of a pump actuator 10 may be subject to large forces at the contact interface at the opposite roller facing surface 38 of the pad 40, where the cam 12 transfers forces to the pad 40 of the pump actuator body 30 through the roller 28 of the roller assembly. In particular embodiments, the opposite roller facing surface 38 of the pad 40 may be provided with one or more surface enhancing treatment, wherein the surface enhancing treatments may be designed to increase the fatigue life of the pump actuator body.

In particular embodiments, a surface enhancing treatment may comprise shot peening the opposite roller facing surface 38 of pad 40. As a non-limiting example, carefully designed shot peening may be used to impart residual compressive stresses and/or local thickening to the pad 40, which may provide improved ability to counteract cyclic tensile loadings experienced by the side of the plunger facing surface 32 of the pad 40, and to enable the pad 40 to better resist and endure high fatigue loads, thus providing significant improvements to material properties, stress bearing capabilities, and fatigue life of the pump actuator without adding material or mass to the pump actuator body.

In particular embodiments, shot peening may also be used to dimensionally modify parts of the pump actuator assembly, separately or in addition to machining. As a non-limiting example, shot peening may be separately or additionally applied to maintain a clearance for the roller bearing within the pump actuator assembly.

Improving these performance feature and operational life of the pump actuator at a competitive weight and size is a key benefit of these innovative features. As has been discussed before, mass and mass distribution of the components and assemblies of the pump actuator are vital considerations due to the dynamic nature of its loading and operation. As another non-limiting example, it can be especially important to constrain the dimensions of the pump actuator for packaging reasons, such as fitting the roller within the pump actuator in a constrained geometry.

Figure 5A:
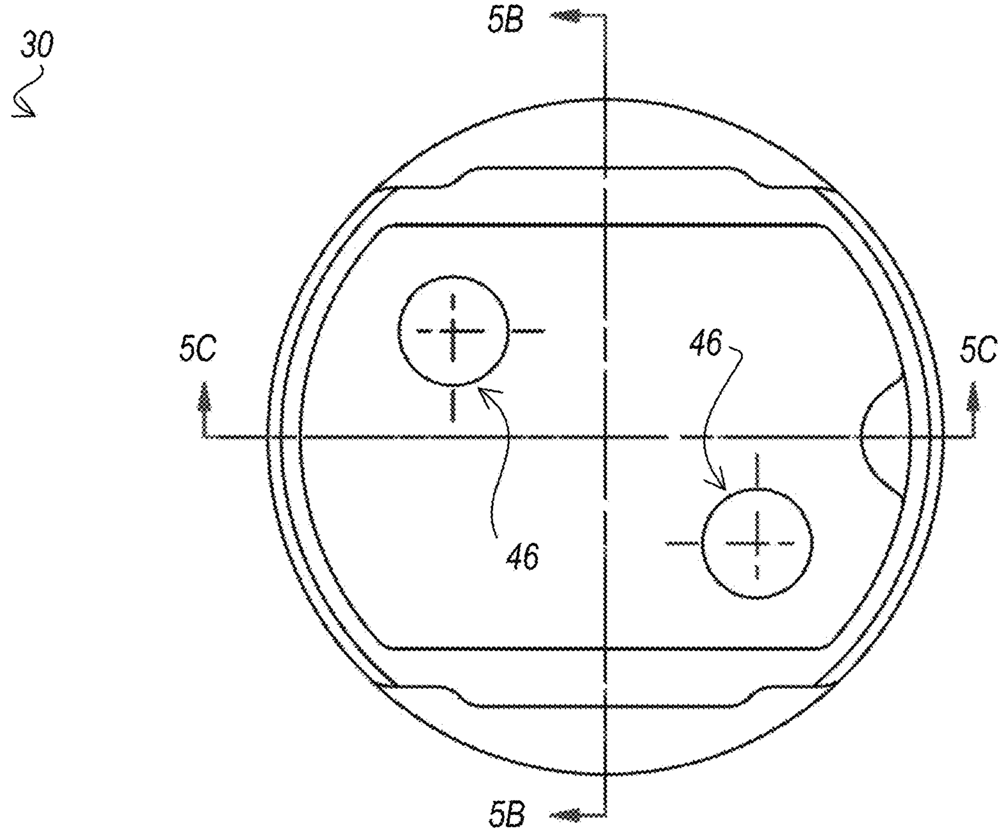
FIG. 5A illustrates a top section view of a pump actuator body, according to particular embodiments.
Figure 5B:
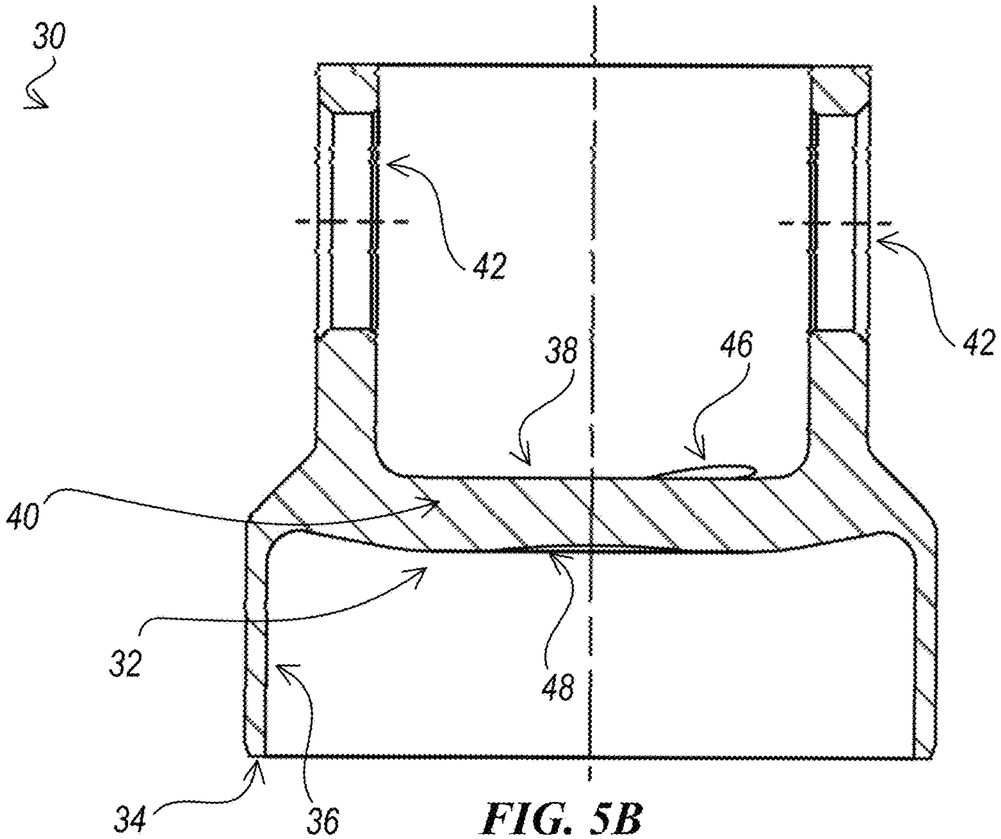
FIG. 5B illustrates a sectional view taken through the pump actuator body of FIG. 5A taken along lines 5B-5B, according to particular embodiments.
Figure 5C:
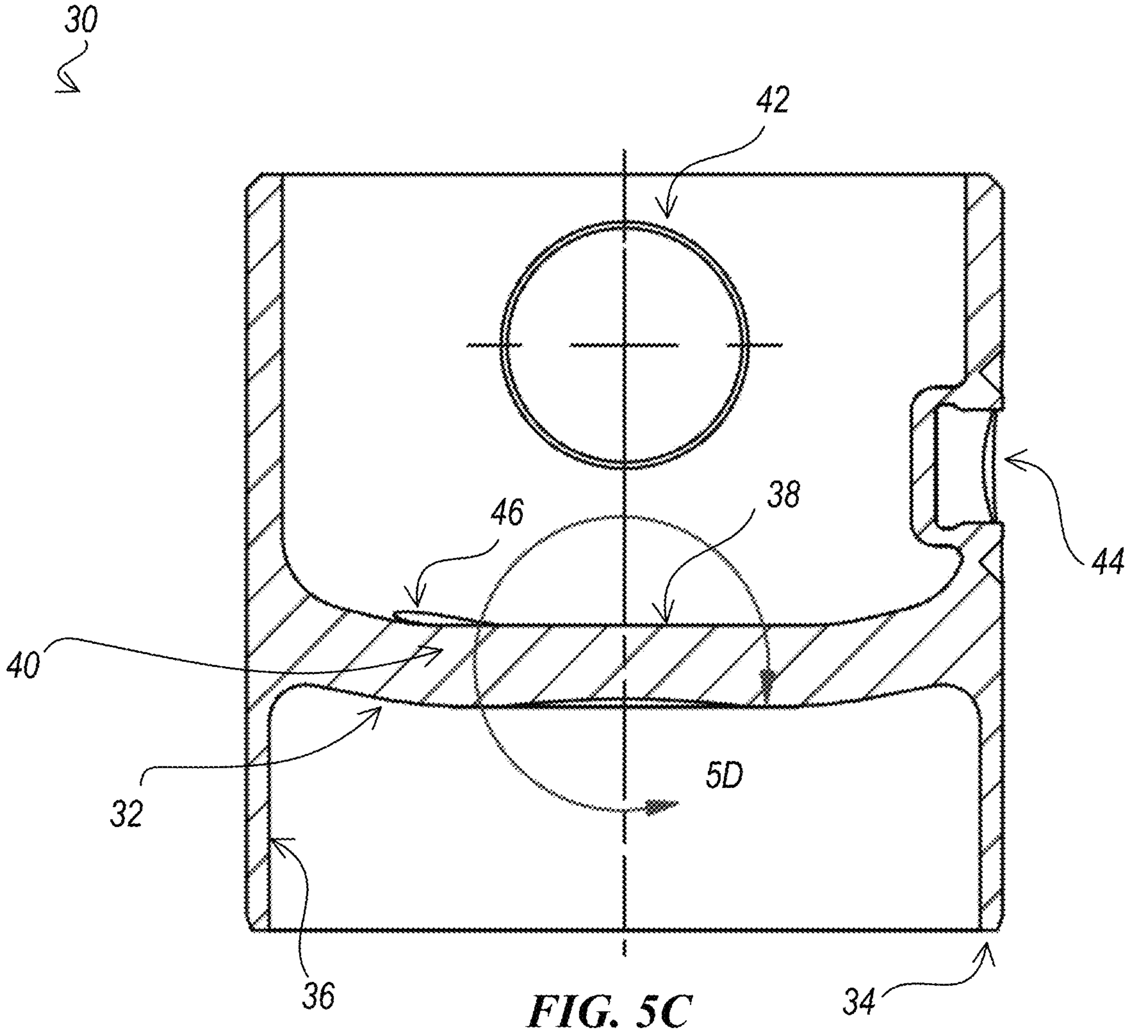
FIG. 5C illustrates a sectional view taken through the pump actuator body of FIG. 5A taken along lines 5C-5C, according to particular embodiments.
Figure 5D:
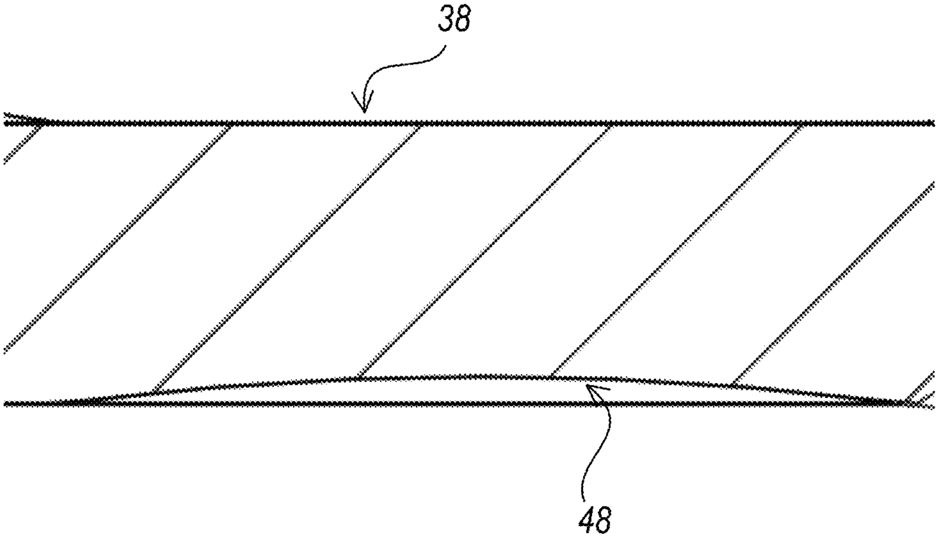
FIG. 5D illustrates an enlarged view of a portion of the pump actuator body of FIG. 5A for an inset region marked 5D, according to particular embodiments.

FIGS. 5A-D illustrate severals views of a pump actuator body 30, according to particular embodiments. FIG. 5A illustrates a top section view of a pump actuator body 30, according to particular embodiments. FIG. 5B illustrates a sectional view taken through the pump actuator body 30 of FIG. 5A taken along lines 5B-5B, according to particular embodiments. FIG. 5C illustrates a sectional view taken through the pump actuator body 30 of FIG. 5A taken along lines 5C-5C, according to particular embodiments. FIG. 5D illustrates an enlarged view of a portion of the pump actuator body 30 of FIG. 5A for the inset region marked 5D, according to particular embodiments.

In particular embodiments, a pump actuator body 30 may comprise a plunger facing surface 32 that is generally recessed into the pump actuator body 30 and offset from a radial end 34. A cylindrical wall 36 may be provided between the radial end 34 and the plunger facing surface 32. A pad 40 may be disposed between the plunger facing surface 32 and an opposite roller facing surface 38. In particular embodiments, axle cavities 42 may be configured to accommodate a roller assembly.

In particular embodiments, a pump actuator 10 may be provided with an anti-rotation feature. By way of example and not limitation, an anti-rotation feature may comprise an anti-rotation pin crevice 44, configured to receive an anti-rotation pin. In particular embodiments, one or more vent holes 46 in the form of bores for oil and air flow may be additionally provided.

In particular embodiments, the opposite roller facing surface 38 of the pad 40 may be provided with one or more surface enhancing treatment, wherein the surface enhancing treatments may be designed to increase the fatigue life of the pump actuator body. In particular embodiments, a surface enhancing treatment may comprise shot peening the opposite roller facing surface 38 of pad 40.

In particular embodiments, one or more surface features, such as surface feature 48, may be formed on the pad 40 on the plunger facing surface 32, the surface features being formed to specifically increase the fatigue life of the pump actuator body. In particular embodiments, a surface feature 48 may be configured to receive a complementary surface of a plunger when the plunger makes contact with the pad 40. In particular embodiments, a surface feature 48 may be concave on the pad side of the pump actuator body.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

For the recitation of numeric ranges herein, the ranges are inclusive of end points, and each intervening number within the range is explicitly contemplated with the same degree of precision. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

The invention claimed is:

1. A pump actuator for use between a cam and a pump, the pump actuator comprising:

a pump actuator body comprising:

a pad including a plunger facing surface and an opposite roller facing surface, and a cylindrical wall extending from the plunger facing surface to an open radial end of the pump actuator body such that the plunger facing surface is recessed into the pump actuator body and offset from the radial end; and a roller assembly including a roller, bearings, and a roller axle, wherein the plunger facing surface includes a concave surface feature, and wherein the roller of the roller assembly is configured to engage the cam and to contact the roller facing surface so as to transfer forces from the cam to the pad.

2. The pump actuator of claim 1, wherein the concave surface feature is configured to receive a complementary surface of a plunger when the plunger makes contact with the pad.

3. The pump actuator of claim 2, wherein the pump is a fuel pump, and wherein the plunger is coupled to the fuel pump.

4. The pump actuator of claim 1, wherein the pump actuator body has a unitary construction.

5. The pump actuator of claim 1, wherein the pump actuator body is cold formed.

6. The pump actuator of claim 1, wherein the roller facing surface includes a surface enhancing treatment comprising shot peening.

7. A pump actuator for use between a cam and a pump, the pump actuator comprising:

a pump actuator body comprising:

a pad including a plunger facing surface and an opposite roller facing surface, and a cylindrical wall extending from the plunger facing surface to a radial end of the pump actuator body such that the plunger facing surface is recessed into the pump actuator body and offset from the radial end; and a roller assembly including a roller, bearings, and a roller axle, wherein the roller of the roller assembly is configured to engage the cam and to contact the roller facing surface so as to transfer forces from the cam to the pad, and wherein the roller facing surface includes a surface enhancing treatment.

8. The pump actuator of claim 7, wherein the surface enhancing treatment comprises shot peening.

9. The pump actuator of claim 7, wherein the pump actuator body has a unitary construction.

10. The pump actuator of claim 7, wherein the pump actuator body is cold formed.

11. The pump actuator of claim 7, wherein the plunger facing surface includes a concave surface feature configured to receive a complementary surface of a plunger when the plunger makes contact with the pad.

* * * * *